H. C. Storrs,
Tool Handle,
N° 77,332. Patented Apr. 28, 1868.

Witnesses:
J. M. Coombs
A. Kellery

Inventor:
H. C. Storrs

United States Patent Office.

H. C. STORRS, OF NEW YORK, N. Y.

Letters Patent No. 77,332, dated April 28, 1868.

IMPROVEMENT IN FILE-HANDLES.

*The Schedule referred to in these Letters Patent and making part of the same.*

TO ALL WHOM IT MAY CONCERN:

Be it known that I, H. C. STORRS, of the city, county, and State of New York, have invented a new and useful Improvement in Means of Attaching Tools to Handles; and I do hereby declare that the following is a full, clear, and exact description of the same, reference being had to the accompanying drawing, making a portion of this specification, in which—

Figures 1, 2:
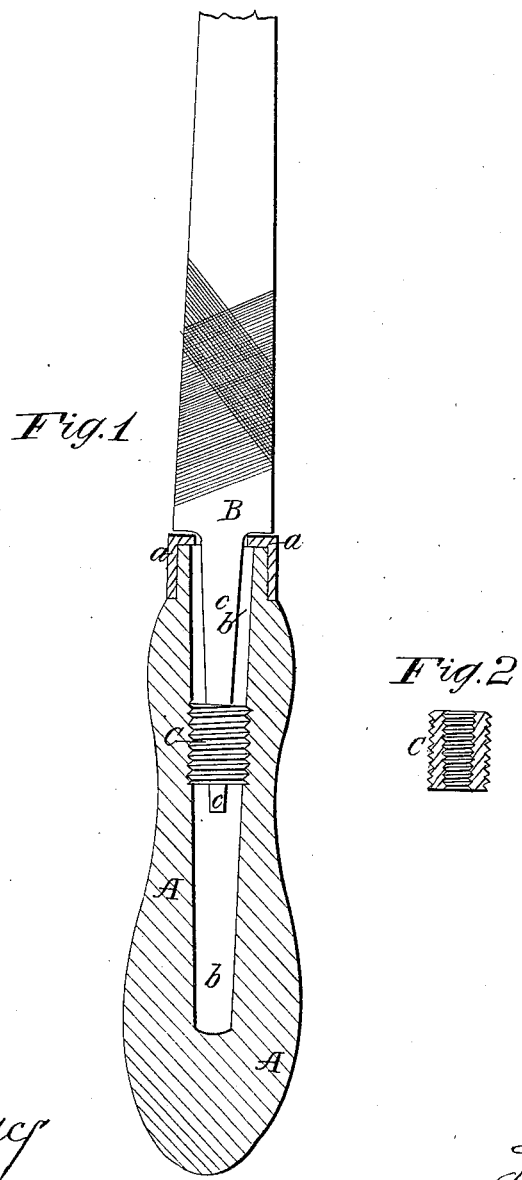
Figure 1 is a side view and partial section, showing a tool fitted to its handle according to my invention.
Figure 2 is a detached section, showing one portion of the invention.

This invention consists in an externally and internally-threaded holding-nut, so combined with a chambered handle and the shank of a file, chisel, or similar tool, as to afford a very secure and convenient means of attaching the tool to such handle, either permanently or temporarily.

To enable others to understand the nature and construction of my invention, I will proceed to describe it with reference to the drawings.

A represents the tool-handle, of any suitable external form, and intended to be of any appropriate wood, or other like material, and furnished at its inner end with an annular ferrule, $a$. Formed centrally within this handle is a longitudinal chamber, $b$, of cylindrical form. The file, chisel, or other tool, indicated at B, is furnished with the ordinary tapering shank $c$, which has screwed upon it a cylindrical nut, C, which may be of steel or hardened iron, and the internal construction of which is shown more fully in fig. 2; the said nut being provided with an internal screw-thread, whereby it is firmly fixed upon the shank of the tool, and also with an external screw-thread, as shown more fully in fig. 1, which, when the shank is inserted into the chamber $b$, of the handle, is screwed into the surrounding sides of the said chamber by turning the tool around upon its longitudinal axis, thus embedding the external thread of the nut in the said sides of the chamber, as shown in fig. 1, and thereby firmly securing the tool to the handle, the tool being capable of ready detachment from the handle by simply turning the same in a reverse direction to that just mentioned, thus unscrewing the nut from the said handle.

What I claim as my invention, and desire to secure by Letters Patent, is—

The internally and externally-threaded nut C, in combination with the chambered handle A, for holding the shank $c$ of the tool B, substantially as specified.

H. C. STORRS.

Witnesses:
J. W. COOMBS,
A. LE CLERC.